US012540367B2

(12) United States Patent
Sun et al.

(10) Patent No.: US 12,540,367 B2
(45) Date of Patent: Feb. 3, 2026

(54) SELECTIVE EXTRACTION OF LITHIUM FROM CLAY MINERALS

(71) Applicant: TESLA, INC., Palo Alto, CA (US)

(72) Inventors: Zhiwen Sun, Sunnyvale, CA (US); Huiyuan Chen, Philadelphia, PA (US); Turner Boris Caldwell, San Francisco, CA (US); Anthony Michael Thurston, Morgan Hill, CA (US)

(73) Assignee: Tesla, Inc., Austin, TX (US)

( * ) Notice: Subject to any disclaimer, the term of this patent is extended or adjusted under 35 U.S.C. 154(b) by 187 days.

(21) Appl. No.: 17/136,701

(22) Filed: Dec. 29, 2020

(65) Prior Publication Data

US 2021/0207243 A1    Jul. 8, 2021

Related U.S. Application Data

(60) Provisional application No. 62/956,763, filed on Jan. 3, 2020.

(51) Int. Cl.
*C22B 7/00* (2006.01)
*C22B 26/12* (2006.01)

(52) U.S. Cl.
CPC ............ *C22B 7/007* (2013.01); *C22B 26/12* (2013.01)

(58) Field of Classification Search
None
See application file for complete search history.

(56) References Cited

U.S. PATENT DOCUMENTS

| | | | | |
|---|---|---|---|---|
| 2,533,246 A | * | 12/1950 | Hayes | C22B 26/12 |
| | | | | 423/179.5 |
| 2,662,809 A | * | 12/1953 | Adolphe | C22B 26/12 |
| | | | | 423/181 |
| 3,073,673 A | * | 1/1963 | Chubb | C22B 26/12 |
| | | | | 423/192 |
| 4,174,014 A | | 11/1979 | Bjorksten | |
| 4,336,644 A | | 6/1982 | Medlin | |
| 4,352,316 A | | 10/1982 | Medlin | |
| 4,588,566 A | | 5/1986 | Kluksdahl | |
| 4,944,553 A | | 7/1990 | Medley et al. | |
| 5,086,860 A | | 2/1992 | Francis et al. | |
| 5,305,513 A | | 4/1994 | Lucid et al. | |

(Continued)

FOREIGN PATENT DOCUMENTS

| | | | |
|---|---|---|---|
| CN | 1827527 | | 9/2006 |
| CN | 109517981 A | * | 3/2019 |

(Continued)

OTHER PUBLICATIONS

Michaud, Dry Grinding vs. Wet Grinding, May 25, 2017, 911Metallurgist (Year: 2017).*

(Continued)

*Primary Examiner* — Keith D. Hendricks
*Assistant Examiner* — Nikolas Takuya Pullen
(74) *Attorney, Agent, or Firm* — Knobbe Martens Olson & Bear LLP

(57) ABSTRACT

Processes for extracting lithium from a clay mineral and compositions thereof are described. The extraction process includes providing a clay mineral comprising lithium, mixing a cation source with the clay mineral, performing a high-energy mill of the clay mineral, and performing a liquid leach to obtain a lithium rich leach solution.

25 Claims, 10 Drawing Sheets

(56) References Cited

U.S. PATENT DOCUMENTS

| | | | |
|---|---|---|---|
| 5,370,438 A | 12/1994 | Mori et al. |
| 5,534,364 A | 7/1996 | Watanabe et al. |
| 5,613,727 A | 3/1997 | Yamazaki |
| 5,619,784 A | 4/1997 | Nishimoto et al. |
| 5,620,057 A | 4/1997 | Klemen et al. |
| 5,639,571 A | 6/1997 | Waters et al. |
| 5,681,668 A | 10/1997 | Reed et al. |
| 5,924,765 A | 7/1999 | Lee |
| 6,053,564 A | 4/2000 | Kamata et al. |
| 6,094,927 A | 8/2000 | Anazawa et al. |
| 6,139,094 A | 10/2000 | Teply et al. |
| 6,168,226 B1 | 1/2001 | Wycech |
| 6,189,953 B1 | 2/2001 | Wycech |
| 6,224,998 B1 | 5/2001 | Brouns et al. |
| 6,227,322 B1 | 5/2001 | Nishikawa |
| 6,322,135 B1 | 11/2001 | Okana et al. |
| 6,354,656 B1 | 3/2002 | Hwang |
| 6,357,819 B1 | 3/2002 | Yoshino |
| 6,386,625 B1 | 5/2002 | Dukat et al. |
| 6,435,601 B1 | 8/2002 | Takahara |
| 6,447,052 B2 | 9/2002 | Saeki |
| 6,471,285 B1 | 10/2002 | Czaplicki et al. |
| 6,547,020 B2 | 4/2003 | Maus et al. |
| 6,632,560 B1 | 10/2003 | Zhou et al. |
| 6,662,891 B2 | 12/2003 | Misu et al. |
| 6,672,653 B2 | 1/2004 | Nishikawa et al. |
| 6,676,200 B1 | 1/2004 | Peng |
| 6,786,533 B2 | 9/2004 | Bock et al. |
| 6,793,274 B2 | 9/2004 | Riley et al. |
| 6,805,400 B2 | 10/2004 | Bruderick et al. |
| 7,090,293 B2 | 8/2006 | Saberan et al. |
| 7,118,170 B2 | 10/2006 | Montanvert et al. |
| 7,255,388 B2 | 8/2007 | Le Gall et al. |
| 7,427,093 B2 | 9/2008 | Watanabe et al. |
| 7,654,352 B2 | 2/2010 | Takasaki et al. |
| 7,717,207 B2 | 5/2010 | Watanabe et al. |
| 7,770,525 B2 | 8/2010 | Kumar et al. |
| 7,850,229 B2 | 12/2010 | Ihashi et al. |
| 7,963,588 B2 | 6/2011 | Kanagai et al. |
| 8,002,339 B2 | 8/2011 | Rill et al. |
| 8,007,032 B1 | 8/2011 | Craig |
| 8,011,721 B2 | 9/2011 | Yamada et al. |
| 8,037,960 B2 | 10/2011 | Morenko et al. |
| 8,047,603 B2 | 11/2011 | Goral et al. |
| 8,066,322 B2 | 11/2011 | Mori |
| 8,070,215 B2 | 12/2011 | Yoshioka et al. |
| 8,091,669 B2 | 1/2012 | Taneda et al. |
| 8,113,572 B2 | 2/2012 | Mildner et al. |
| 8,308,227 B2 | 11/2012 | Tsuruta et al. |
| 8,366,185 B2 | 2/2013 | Herntier |
| 8,383,242 B2 | 2/2013 | Malek et al. |
| 8,502,161 B2 | 8/2013 | Hahto et al. |
| 8,696,051 B2 | 4/2014 | Charbonneau et al. |
| 2001/0030069 A1 | 10/2001 | Misu et al. |
| 2002/0162696 A1 | 11/2002 | Maus et al. |
| 2003/0090129 A1 | 5/2003 | Riley et al. |
| 2004/0016580 A1 | 1/2004 | Kronner et al. |
| 2006/0005695 A1 | 1/2006 | Honlinger et al. |
| 2009/0021052 A1 | 1/2009 | Kato |
| 2009/0186266 A1 | 7/2009 | Nishino et al. |
| 2009/0242299 A1 | 10/2009 | Takasaki et al. |
| 2010/0025132 A1 | 2/2010 | Hill et al. |
| 2010/0175940 A1 | 7/2010 | Taneda et al. |
| 2010/0273040 A1 | 10/2010 | Kubota et al. |
| 2010/0289295 A1 | 11/2010 | Yoda et al. |
| 2010/0307848 A1 | 12/2010 | Hashimoto et al. |
| 2011/0300427 A1 | 12/2011 | Iwasa et al. |
| 2012/0021301 A1 | 1/2012 | Ohashi |
| 2012/0028135 A1 | 2/2012 | Ohashi |
| 2012/0073888 A1 | 3/2012 | Taneda et al. |
| 2012/0103714 A1 | 5/2012 | Choi et al. |
| 2012/0119546 A1 | 5/2012 | Honda et al. |
| 2012/0153669 A1 | 6/2012 | Nagwanshi et al. |
| 2012/0156539 A1 | 6/2012 | Honjo et al. |
| 2012/0161429 A1 | 6/2012 | Rawlinson et al. |
| 2012/0161472 A1 | 6/2012 | Rawlinson et al. |
| 2012/0248825 A1 | 10/2012 | Tamura |
| 2022/0186341 A1* | 6/2022 | Wen .................... C22B 1/02 |

FOREIGN PATENT DOCUMENTS

| | | | |
|---|---|---|---|
| CN | 110358934 | 10/2019 | |
| JP | 63-97473 | 4/1988 | |
| JP | 05-170140 | 7/1993 | |
| JP | 05-294258 | 11/1993 | |
| JP | 10-252466 | 9/1998 | |
| JP | 04-92781 | 3/2004 | |
| JP | 2009-193942 | 8/2009 | |
| WO | WO 12/063393 | 5/2012 | |
| WO | WO-2018023159 A1 * | 2/2018 | ............ C22B 26/12 |
| WO | WO 19/190301 | 10/2019 | |

OTHER PUBLICATIONS

Safety Data Sheet Calcium sulfate dihydrate, Aug. 12, 2014, EMD Millipore Corporation, (Year: 2014).*

Sodium Sulfate Product Information Sheet, Jul. 31, 2013, Interchim, (Year: 2013).*

Webmineral Spodumene Mineral Data, Sep. 2, 2000 (Year: 2000).*

Planetary Ball Mill, 911 Metallurgist, Sep. 17, 2017 (Year: 2017).*

Tomsic, Joan L., Dictionary of Materials and Testing, 2000, SAE International, p. 344 (Year: 2000).*

Sodium Chloride Powder Safety Data Sheet, Sep. 1, 2016, Edvotek (Year: 2016).*

Lee, 2015, Extraction of lithium from lepidolite using mixed grinding with sodium sulfide followed by water leaching, Minerals, 5:737-743.

Amer, Oct. 2008, The hydrometallurgical extraction of lithium from Egyptian monmorillonite-type clay, Journal of Metals, 60(10):55-57.

Lien, Dec. 31, 1985, Recovery of lithium from a montmorillonite-type clay, US Dept. of Interior Report of Investigations 8967, 30 pp.

Setoudeh et al., 2018, Enhancing lithium leaching by mechanical activation, Mong. J. Chem., 19(45):44-48.

Yan, 2012, Extraction of lithium from lepidolite using chlorination roasting-water leaching process, Trans. Nonferrous Met. Soc. China, 22(7):1753-1759.

International search report and written opinion dated Mar. 4, 2021 in application No. PCT/US2020/067344.

* cited by examiner

SELECTIVE EXTRACTION OF LITHIUM FROM CLAY MINERALS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Prov. App. No. 62/956,763, filed Jan. 3, 2020, which is incorporated by reference herein in its entirety for all purposes.

BACKGROUND

Field

This disclosure is generally related to extractions. More specifically, this disclosure is related to methods of selectively extracting lithium from clay minerals.

Description of the Related Art

Lithium is a strategic metal for the lithium ion battery (LIB) and electric vehicle (EV) industry. Therefore, a means for economically extracting lithium from various lithium sources is important in order to reduce the cost of batteries and electric cars. The dominant lithium sources commonly used for mining are lithium brines due to the low cost associated with Li extraction from these brine sources. However, the ever-increasing demand for LIBs makes it necessary to explore other lithium sources.

Another method for Li extraction is to extract the Li from clay minerals. In this process, the lithium is obtained by acid leaching, where clay minerals are mixed with an aqueous solution of common mineral acids, such as $H_2SO_4$ or HCl, and then heated under atmospheric pressure to leach out the lithium contained in the clay minerals. This acid leach method not only leaches out lithium, but it also leaches out high concentrations of impurities including Na, K, Fe, Al, Ca, and Mg. High lithium loss from the subsequent removal of the impurity elements, especially Al removal, may significantly lower the overall lithium extraction efficiency. Furthermore, high acid consumption and complicated leach solution purification methods also make the overall extraction process less cost-effective and not environmentally friendly.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In one aspect, a process for extracting lithium from a clay mineral is described. The process includes providing a clay mineral comprising lithium, mixing a cation source with the clay mineral, wherein the cation source comprises a cation and an anion, performing a high-energy mill of the clay mineral, and performing a liquid leach to obtain a lithium rich leach solution, wherein performing the liquid leach comprises adding a solvent to a mixture of the clay mineral and the cation source subsequent to performing the high-energy mill.

In another aspect, a process for extracting lithium from a clay mineral is described. The process includes providing a clay mineral comprising lithium, performing a high-energy mill of the clay mineral, mixing a cation source with the clay mineral concurrently with, before or after performing the high-energy mill to form a mixture, wherein the cation source comprises a cation and an anion, and contacting the milled clay material and cation source mixture with a solvent to extract lithium from the milled clay material and form a lithium rich leach solution.

In some embodiments, the cation source is mixed with the clay mineral prior to performing the high-energy mill. In some embodiments, the cation source is mixed with the clay mineral concurrently with performing the high-energy mill. In some embodiments, the cation source is mixed with the clay mineral subsequent to performing the high-energy mill.

In some embodiments, the clay mineral comprises about 0.3-5 g of Li/kg of clay. In some embodiments, the clay mineral comprises about 0.1-5 g of Li/kg of clay. In some embodiments, the clay mineral further includes an additional mineral. In some embodiments, the additional mineral is selected from the group consisting of spodumene, lepidolite, zinnwaldite, smectite and hectorite, or combinations thereof. In some embodiments, the additional mineral is selected from the group consisting of spodumene, lepidolite, zinnwaldite, smectite, hectorite, muscovite, and combinations thereof. In some embodiments, the clay mineral comprises an additional element selected from the group consisting of sodium, potassium, iron, aluminum, calcium, magnesium, silicon and chromium, or combinations thereof.

In some embodiments, the cation of the cation source is selected from the group consisting of an alkaline metal and an alkaline-earth metal, or combinations thereof. In some embodiments, the anion of the cation source is selected from the group consisting of a halide, $SO_4^-$ and $NO_3^-$, or combinations thereof. In some embodiments, the cation source is selected from the group consisting NaCl, KCl, $Na_2SO_4$, $K_2SO_4$, $NaNO_3$, $KNO_3$, $CaCl_2$, $MgCl_2$, $Ca(NO_3)_2$ and $Mg(NO_3)_2$, or combinations thereof. In some embodiments, the cation source is selected from the group consisting NaCl, KCl, $Na_2SO_4$, $K_2SO_4$, $MgSO_4$, $CaSO_4$, $NaNO_3$, $KNO_3$, $CaCl_2$, $MgCl_2$, $Ca(NO_3)_2$, $Mg(NO_3)_2$, and combinations thereof. In some embodiments, the weight ratio of the cation source to the clay mineral is about 1:3 to about 1:20. In some embodiments, the weight ratio of the cation source to the clay mineral is about 1:3 to about 1:50. In some embodiments, the molar ratio of the cation of the cation source to lithium of the clay mineral is about 1:1 to about 30:1. In some embodiments, the molar ratio of the cation of the cation source to lithium of the clay mineral is about 1:1 to about 10:1.

In some embodiments, performing the high-energy mill comprises utilizing a ball mill. In some embodiments, the high-energy mill is selected from the group consisting of a planetary ball-mill, a Spex mill, an attritor mill, a high shear high energy mill, and a vibratory mill, or combinations thereof. In some embodiments, the process further comprises pulverizing the clay mineral prior to performing the high-energy mill.

In some embodiments, the liquid leach is performed at about 20-100° C. In some embodiments, a weight ratio of the mixture to the solvent is about 1:10 to about 3:10. In some embodiments, the solvent comprises water. In some embodiments, performing the liquid leach further comprises agitation of the mixture.

In some embodiments, the lithium rich leach solution comprises at least 30 ppm of lithium. In some embodiments, the lithium rich leach solution comprises at least 100 ppm of lithium. In some embodiments, the lithium extraction efficiency of the lithium rich leach solution relative to the clay mineral is at least about 50%. In some embodiments, the lithium rich leach solution comprises at most about 100 ppm of aluminum or iron. In some embodiments, the lithium rich leach solution comprises at most about 500 ppm of magnesium or calcium. In some embodiments, the lithium rich leach solution comprises at most about 2000 ppm of magnesium or calcium. In some embodiments, the aluminum or iron extraction efficiency of the lithium rich leach solution relative to the clay mineral is at most about 1%.

In some embodiments, the lithium rich leach solution has a pH of about 8-10. In some embodiments, the lithium rich leach solution has a pH of about 5-10. In some embodiments, a strong acid is not utilized during the process. In some embodiments, the process further comprises filtering the lithium rich leach solution. In some embodiments, a mixing solvent is provided to at least one of the clay mineral, cation source, and high-energy mill. In some embodiments, the mixing solvent comprises water.

In another aspect, a lithium rich leach composition is described. The composition includes a spent clay mineral comprising at most 2 g of Li/kg of clay, and a lithium rich leach solution. The lithium rich leach solution includes water, lithium at a concentration of at least 30 ppm, aluminum at a concentration of at most 10 ppm, iron at a concentration of at most 10 ppm, potassium, calcium at a concentration of at most 1000 ppm, magnesium at a concentration of at most 1000 ppm, and a pH of about 8-10.

In another aspect, a lithium rich leach composition is described. The composition includes a spent clay mineral comprising at most 5 g of Li/kg of clay, and a lithium rich leach solution. The lithium rich leach solution includes water, lithium at a concentration of at least 100 ppm, aluminum at a concentration of at most 10 ppm, iron at a concentration of at most 10 ppm, potassium at a concentration of at most 8000 ppm, calcium at a concentration of at most 3000 ppm, magnesium at a concentration of at most 3000 ppm, and a pH of about 5-10.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Figure 1A:
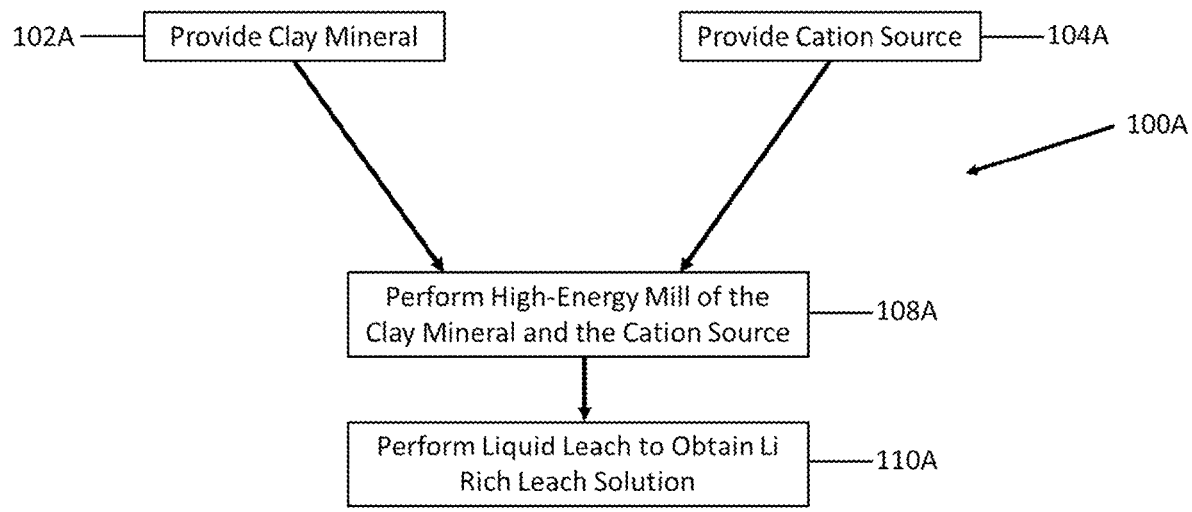
FIG. 1A is a flow chart of one embodiment of a process for selectively extracting lithium from a clay mineral by performing a high energy mill.

The present disclosure relates to methods and systems for efficient and selective extraction of lithium from clay minerals, while limiting the extraction of impurities within these minerals. One embodiment is a method of extracting lithium from clay materials based on the discovery that an effective ion-exchange occurs between appropriate cations and lithium contained within clay minerals. This ion-exchange was discovered to induce selective Li extraction from the clay materials.

Furthermore, additional energy can be provided to enhance the rate and extent of the ion exchange between the cations provided and the lithium contained in the clay. In some embodiments, the energy may be provided to the clay by milling or grinding a mixture of cation sources and the clay mineral, such that the particle sizes are reduced, particle structures are deformed, and other chemical changes take place that may facilitate the desired ion-exchange. In one embodiment, a high-energy mill may be used to reduce the particle size of the clay material. Examples of high energy mills include a ball mill, a Spex mill, a high shear high energy mill, an attritor mill, and a vibratory mill, or combinations of one or more of these mills.

Examples of monovalent ion exchanges and monovalent to divalent ion exchanges are shown below.

Monovalent Ion-Exchange:

$$Na^+_{solution} + Li^+_{clay} \rightarrow Na^+_{clay} + Li^+_{solution} \quad \quad 1)$$

$$Na^+_{solution} + K^+_{clay} \rightarrow Na^+_{clay} + K^+_{solution} \quad \quad 2)$$

Monovalent to Divalent Ion-Exchange:

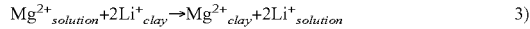

$$Mg^{2+}_{solution} + 2Li^+_{clay} \rightarrow Mg^{2+}_{clay} + 2Li^+_{solution} \qquad (3)$$

$$Ca^{2+}_{solution} + 2Li^+_{clay} \rightarrow Ca^{2+}_{clay} + 2Li^+_{solution} \qquad (4)$$

Although certain embodiments and examples are described below, those of skill in the art will appreciate that the invention extends beyond the specifically disclosed embodiments and/or uses and obvious modifications and equivalents thereof. Thus, it is intended that the scope of the invention disclosed herein should not be limited by any particular embodiments described below.

Clay minerals typically contain a low concentration of lithium. In some embodiments, the clay mineral contains much higher concentrations of one or more additional elements, relative to lithium. In some embodiments, the additional element may be selected from the group consisting of Na, K, Fe, Al, Ca, Mg, Si and Cr, or combinations thereof.

In some embodiments, the clay mineral comprises or comprises about, 0.01 g of Li/kg of clay, 0.05 g of Li/kg of clay, 0.08 g of Li/kg of clay, 0.1 g of Li/kg of clay, 0.2 g of Li/kg of clay, 0.3 g of Li/kg of clay, 0.5 g of Li/kg of clay, 0.8 g of Li/kg of clay, 1 g of Li/kg of clay, 1.5 g of Li/kg of clay, 2 g of Li/kg of clay, 2.5 g of Li/kg of clay, 3 g of Li/kg of clay, 4 g of Li/kg of clay, 5 g of Li/kg of clay or 10 g of Li/kg of clay, or any range of values therebetween. For example, in some embodiments, the clay mineral comprises or comprises about 0.1-5 g of Li/kg of clay, 0.5-2 g of Li/kg of clay or 0.3-5 g of Li/kg of clay. Table 1 shows an example Li and major metallic element composition of a clay mineral.

TABLE 1

Examples of Li and Major Metallic Elements in Clay Minerals

|  | Li (g/kg) | Na (g/kg) | K (g/kg) | Fe (g/kg) | Al (g/kg) | Ca (g/kg) | Mg (g/kg) |
|---|---|---|---|---|---|---|---|
| Example 1 | 0.5-5 | 4-8 | 40-70 | 20-40 | 40-80 | 30-50 | 20-50 |
| Example 2 | 0.5-5 | 3-16 | 4-70 | 30-40 | 8-40 | 5-250 | 10-100 |
| Example 3 | 0.5-5 | 3-16 | 4-70 | 20-40 | 8-80 | 5-250 | 10-100 |

Clay minerals may further include an additional minerals. In some embodiments, the additional minerals may include spodumene, lepidolite, zinnwaldite, smectite, hectorite, muscovite, and combinations thereof. In some embodiments, the additional minerals are additional lithium containing minerals.

FIG. 1A is a flow chart of an embodied process 100A for selectively extracting lithium from a clay mineral. A clay mineral is provided at a state 102A, and a cation source may also be provided at a state 104A. A high-energy mill of the clay mineral and the cation source is then performed at a state 108A, and a liquid leach of the milled clay mineral is performed at a state 110A to obtain a lithium rich solution and a spent clay mineral and/or other solid particles.

Figure 1B:
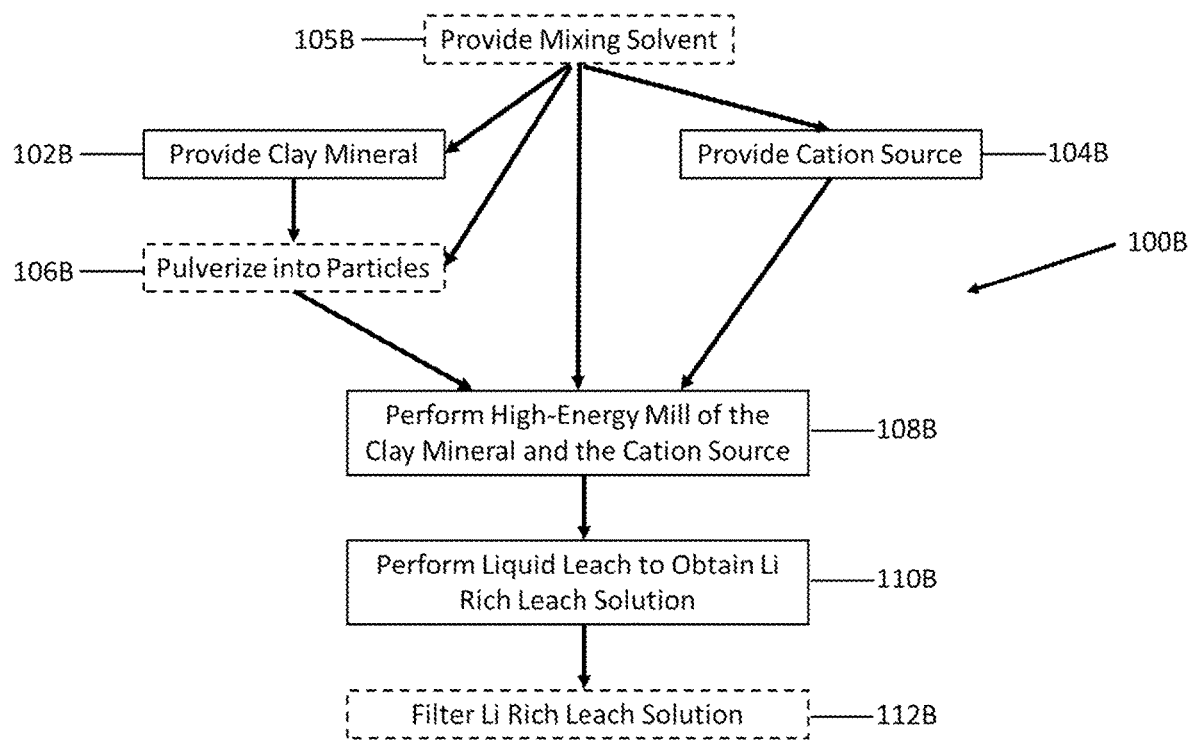
FIG. 1B is a flow chart of one embodiment of a process for selectively extracting lithium from a clay mineral by pulverizing the clay minerals.

FIG. 1B is a flow chart of an embodied process 100B for selectively extracting lithium from a clay mineral. In contrast to the process 100A shown in FIG. 1A, the process 100B shown in FIG. 1B includes a number of optional process steps. A clay mineral is provided at a state 102B, which may optionally be pulverized into particles at a state 106B. A cation source may also be provided at a state 104B. A high-energy mill of the clay mineral and the cation source is then performed at a state 108B, and a liquid leach of the milled clay mineral is performed at a state 110B to obtain a lithium rich solution. A mixing solvent maybe provided at a state 105B to the clay mineral at state 102B, the cation source at state 104B, the pulverized clay particles at state 106B, and/or to the high-energy mill at state 108B. The lithium rich solution may be optionally filtered at a state 112B to remove the spent clay mineral and/or other solid particles from the lithium rich solution.

It is to be understood that pulverization of the clay mineral, addition of a mixing solvent, and/or filtering of the lithium rich solution may be performed in any process described herein. In some embodiments, the mixing solvent is provided to at least one of the clay mineral, cation source, pulverized particles, and high-energy mill. In some embodiments, the mixing solvent is provided to at least two of the clay mineral, cation source, pulverized particles, and high-energy mill. In some embodiments, the mixing solvent is provided to at least three of the clay mineral, cation source, pulverized particles, and high-energy mill. In some embodiments, the mixing solvent is provided to each of the clay mineral, cation source, pulverized particles, and high-energy mill. In some embodiments, the clay mineral and the cation source are concurrently combined in the high-energy mill. In some embodiments, the clay mineral and/or the cation source are continuously fed into the high-energy mill. In some embodiments, the clay mineral and/or the cation source are fed into the high-energy mill sequentially.

Figure 2:
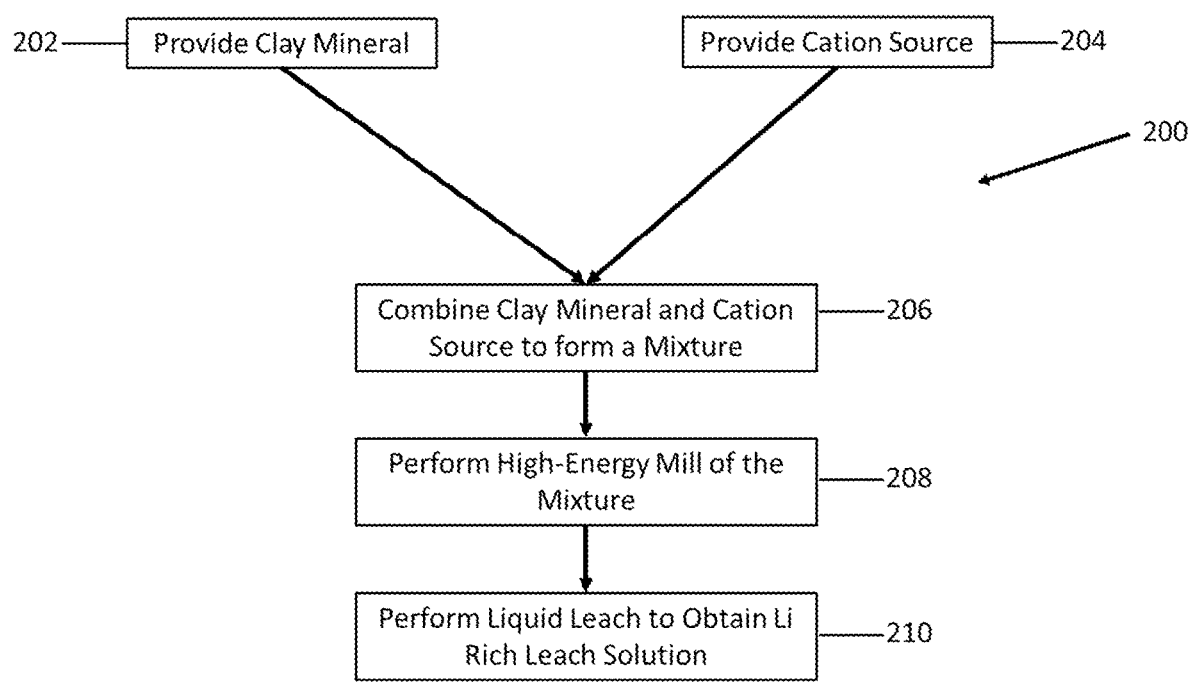
FIG. 2 is a flow chart of one embodiment of a process for selectively extracting lithium from a clay mineral by combining the clay minerals and cation source prior to performing a high-energy mill step.

FIG. 2 is a flow chart of another embodied process 200 for selectively extracting lithium from a clay mineral. A clay mineral is provided at a state 202 and a cation source is provided at a state 204. These materials are combined to form a mixture at a state 206. A high-energy mill of the clay mineral and the cation source is performed at a state 208, and a liquid leach of the milled clay mineral is performed at a state 210 to obtain a lithium rich solution. In contrast to the process 100 shown in FIG. 1A, the process 200 shown in FIG. 2 combines the clay mineral and cation source in a mixture prior to performing the high-energy mill.

Figure 3:
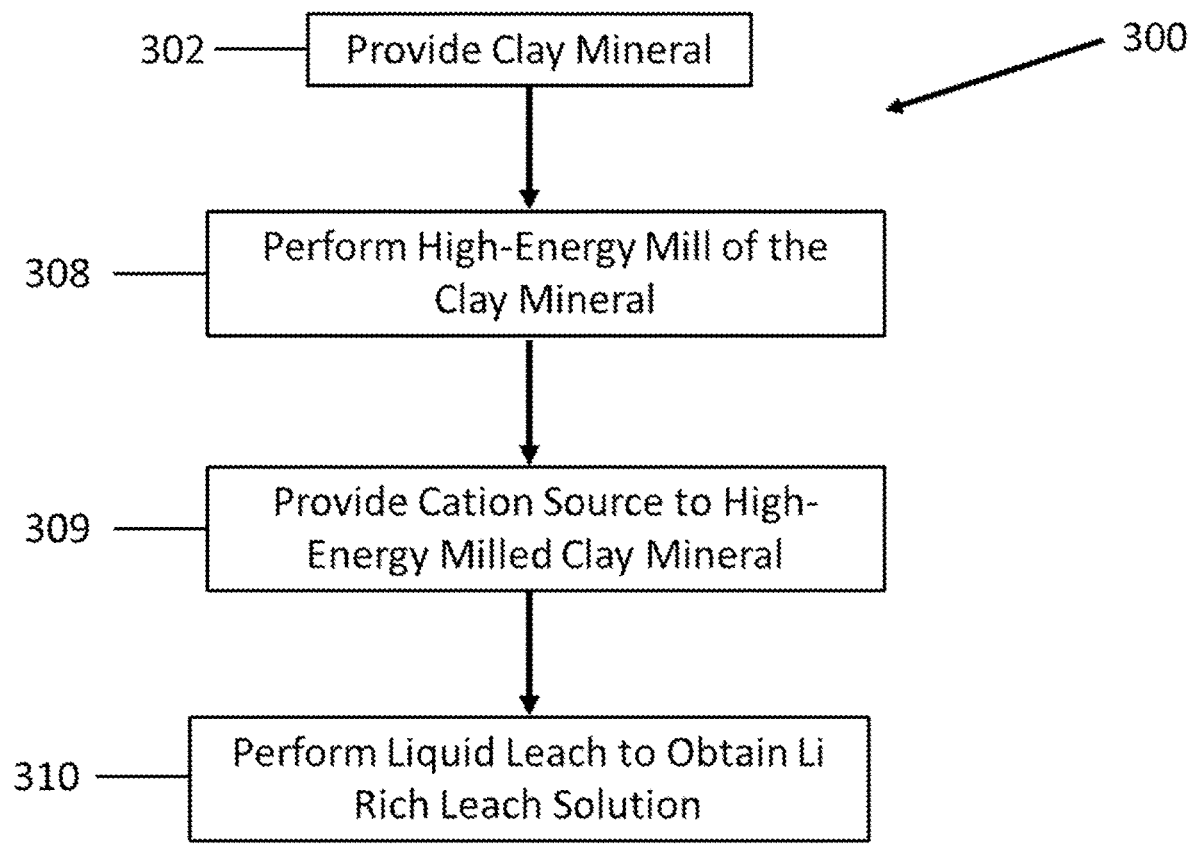
FIG. 3 is a flow chart of one embodiment of a process for selectively extracting lithium from a clay mineral by providing the cation source after milling the clay material.

FIG. 3 is a flow chart of another embodied process 300 for selectively extracting lithium from a clay mineral. A clay mineral is provided at a state 302 and a high-energy mill of the clay mineral is performed at a state 308. Subsequent to the high-energy mill of the clay mineral at the state 308, a cation source is provided to the milled clay mineral at a state 309. A liquid leach of the milled clay mineral and cation source is then performed at a state 310 to obtain a lithium rich solution. In contrast to the process 100 shown in FIG. 1A, the process 300 shown in FIG. 3 introduces the cation source to the clay mineral after performing the high-energy mill.

As described herein the clay mineral is mixed with cation source, wherein the cation source includes a cation and an anion. In some embodiments, the cation of the cation source is selected from the group consisting of an alkaline metal and an alkaline-earth metal, or combinations thereof. In some embodiments, the anion of the cation source is selected from the group consisting of a halide, $SO_4^-$ and $NO_3^-$, or combinations thereof. In some embodiments, the cation source is selected from the group consisting NaCl, KCl, $Na_2SO_4$, $K_2SO_4$, $MgSO_4$, $CaSO_4$, $NaNO_3$, $KNO_3$, $CaCl_2$, $MgCl_2$, $Ca(NO_3)_2$ and $Mg(NO_3)_2$, or combinations thereof. In some embodiments, the cation source is NaCl.

The clay mineral may be combined or loaded with the cation source in pre-determined molar or weight ratios. It is to be understood that a wt. % "load" of a first material is measured relative to the total weight of a second material. For example, if 10 g of NaCl is combined with 100 g of clay mineral, then the clay mineral is loaded with 10 wt. % of NaCl and has a weight ratio of NaCl to clay mineral of 1:10. In some embodiments, the clay mineral is combined with a cation source at, or at about, 1 wt. %, 5 wt. %, 10 wt. %, 15 wt. %, 20 wt. %, 25 wt. %, 30 wt. %, 35 wt. %, 40 wt. %, 45 wt. %, 50 wt. % or 60 wt. % a cation source loading, or any range of values therebetween. In some embodiments, the cation source to clay mineral weight ratio is, or is about, 1:150, 1:100, 1:75, 1:50, 1:25, 1:20, 1:10, 2:10 (i.e. 1:5), 3:10, 1:3, 4:10, 5:10, 6:10, 7:10, 8:10, 9:10, 1:1 or 2:1, or any range of values therebetween. In some embodiments, the molar ratio of the cation of the cation source to lithium of the clay mineral is, or is about, 1:2, 1:1, 2:1, 5:1, 10:1, 15:1, 20:1, 25:1, 30:1, 40:1, 50:1, or any range of values therebetween. For example, in some embodiments, the molar ratio of the cation of the cation source to lithium of the clay mineral is or is about 1:1 to 10:1, 1:1 to 30:1 or 2:1 to 10:1.

The clay mineral is milled or ground in a high-energy mill for desired time duration. In some embodiments, the high-energy mill comprises a ball mill. In some embodiments, the high-energy mill is selected from the group consisting of a planetary ball-mill, a Spex mill, a high shear high energy mill, an attritor mill, and a vibratory mill, or combinations thereof. In some embodiments, the high-energy mill is performed for, or for about, 0.1 hours, 0.25 hours, 0.5 hours, 1 hour, 2 hours, 3 hours, 4 hours, 5 hours, 6 hours, 8 hours, 12 hours, 16 hours, 18 hours or 24 hours, or any range of values therebetween. In some embodiments the clay mineral is milled with the cation source. In some embodiments, the cation source is introduced to the clay mineral subsequent to milling of the clay mineral. In some embodiments, the cation source is introduced to the clay mineral prior to milling the clay mineral. In some embodiments, the clay mineral is pulverized prior to milling.

In some embodiments, the high-energy mill is combined with milling balls and material to be milled (e.g. clay mineral and/or cation source) in pre-determined weight ratios. In some embodiments, the ball to material weight ratio is, or is about, 1:2, 1:1, 2:1, 3:1, 4:1, 5:1, 6:1, 7:1, 8:1, 9:1, 10:1, 15:1 or 20:1, or any range of values therebetween. For example, in some embodiments the ball to material weight ratio is or is about 1:1 to 10:1. In some embodiments, the ball and mixture loading into the high-energy mill is or is about 20%, 30%, 40%, 50%, 60%, 70%, 80%, 90% or 100% of the full mill jar volume, or any range of values therebetween. For example, in some embodiments the ball and mixture loading into the high-energy mill is or is about 40-60% of the full mill jar volume. In some embodiments, the ball and/or mill jar is composed of stainless steel, zirconia, or alumina, or combinations thereof.

In some embodiments, the mixing solvent comprises, consists essentially of, or consists of water. Once the clay material is combined with the mixing solvent prior to performing the milling (with or without the cation source), the mixture may be referred to as a wet milling mixture. The weight percent of the clay mineral to the mixing solvent in the wet milling mixture may be, or be about, 5%, 10%, 20%, 30%, 40%, 50% or 60%, or any range of values therebetween.

In one embodiment, the lithium is extracted from the clay mineral by a liquid leach. In some embodiments, the liquid used in the liquid leach comprises water. In some embodiments, the liquid used in the liquid leach consists essentially of or consists of water. In some embodiments, the clay mineral and/or cation source is combined with a cation source at a, or an about, 1 wt. %, 5 wt. %, 10 wt. %, 15 wt. %, 20 wt. %, 25 wt. %, 30 wt. %, 35 wt. %, 40 wt. %, 45 wt. %, 50 wt. % or 60 wt. % clay mineral and/or cation source loading relative to the liquid, or any range of values therebetween. In some embodiments, the liquid leach is performed at a temperature of or of about 15° C., 20° C., 25° C., 30° C., 35° C., 40° C., 45° C., 50° C., 55° C., 60° C., 70° C., 80° C., 90° C., 100° C. or 120° C., or any range of values therebetween. In some embodiments, the liquid leach is performed for 0.25 hours, 0.5 hours, 1 hour, 2 hours, 3 hours, 4 hours, 5 hours, 6 hours, 8 hours, 12 hours, 16 hours, 18 hours or 24 hours, or any range of values therebetween. In some embodiments, the liquid leach comprises agitation of the mixture. In some embodiments, agitation is performed at 100 RPM, 200 RPM, 300 RPM, 400 RPM, 500 RPM, 600 RPM, 700 RPM, 800 RPM, 900 RPM, 1000 RPM or 1500 RPM, or any range of values therebetween.

Once the liquid leach is complete, a composition comprising a spent clay mineral and a lithium rich leach solution is formed. In some embodiments, the lithium rich leach solution is filtered to remove the spent clay and/or other solid materials. The spent clay mineral comprises, comprises about, comprises at most, or comprises at most about, 10 g of Li/kg of clay, 8 g of Li/kg of clay, 7 g of Li/kg of clay, 6 g of Li/kg of clay, 5 g of Li/kg of clay, 4 g of Li/kg of clay, 3 g of Li/kg of clay, 2 g of Li/kg of clay, 1.5 g of Li/kg of clay, 1.2 g of Li/kg of clay, 1 g of Li/kg of clay, 0.8 g of Li/kg of clay, 0.5 g of Li/kg of clay, 0.3 g of Li/kg of clay, 0.2 g of Li/kg of clay, 0.1 g of Li/kg of clay, 0.05 g of Li/kg of clay or 0.01 g of Li/kg of clay, or any range of values therebetween. In some embodiments, the lithium rich leach solution comprises, comprises about, comprises at least, or comprises at least about 10 ppm, 20 ppm, 30 ppm, 40 ppm, 50 ppm, 60 ppm, 70 ppm, 80 ppm, 90 ppm, 100 ppm, 150 ppm, 200 ppm, 500 ppm, 1000 ppm, 1500 ppm, 2000 ppm, 3000 ppm or 5000 ppm of lithium, or any range of values therebetween. In some embodiments, the lithium rich leach solution comprises, comprises about, comprises at most, or comprises at most about 1500 ppm, 1000 ppm, 500 ppm, 100 ppm, 50 ppm, 10 ppm, 5 ppm, 1 ppm, 0.5 ppm, 0.2 ppm, 0.1 ppm, 0.05 ppm, 0.01 ppm or 0.001 ppm of aluminum, or any range of values therebetween. In some embodiments, the lithium rich leach solution comprises, comprises about, comprises at most, or comprises at most about 1500 ppm, 1000 ppm, 500 ppm, 100 ppm, 50 ppm, 10 ppm, 5 ppm, 1 ppm, 0.5 ppm, 0.2 ppm, 0.1 ppm, 0.05 ppm, 0.01 ppm or 0.001 ppm of iron, or any range of values therebetween. In some embodiments, the lithium rich leach solution comprises, comprises about, comprises at most, or comprises at most about 1500 ppm, 1000 ppm, 500 ppm, 100 ppm, 50 ppm, 10 ppm, 5 ppm, 1 ppm, 0.5 ppm, 0.2 ppm, 0.1 ppm, 0.05 ppm, 0.01 ppm or 0.001 ppm of chromium, or any range of values therebetween. In some embodiments, the lithium rich leach solution comprises at least one additional element. In some embodiments, the additional element is selected from the group consisting of Na, K, Ca, Mg and Si, or any combinations thereof. In some embodiments, the lithium rich leach solution comprises, comprises about, comprises at most, or comprises at most about, 5000 ppm, 4000 ppm, 3000 ppm, 2500 ppm, 2000 ppm, 1800 ppm, 500 ppm, 1000 ppm, 500 ppm, 100 ppm, 50 ppm, 10 ppm, 5 ppm, 1 ppm, 0.5 ppm, 0.2 ppm, 0.1 ppm, 0.05 ppm, 0.01 ppm or 0.001 ppm of calcium, or any range of values therebetween. In some embodiments, the lithium rich leach solution comprises, comprises about, comprises at most, or comprises at most about, 5000 ppm, 4000 ppm, 3000 ppm, 2500 ppm, 2000 ppm, 1800 ppm, 1500 ppm, 1000 ppm, 500 ppm, 100 ppm, 50 ppm, 10 ppm, 5 ppm, 1 ppm, 0.5 ppm, 0.2 ppm, 0.1 ppm, 0.05 ppm, 0.01 ppm or 0.001 ppm of magnesium, or any range of values therebetween.

In some embodiments, the relative amount of an element extracted from the clay mineral and into the lithium rich leach solution may be characterized as the elemental extraction efficiency of the process or the lithium rich leach solution itself. In some embodiments, the lithium extraction efficiency is, is about, is at least, or is at least about, 20%, 30%, 40%, 50%, 60%, 70%, 80%, 85% or 90%, or any range of values therebetween. In some embodiments, the iron extraction efficiency is, is about, is at most, or is at most about, 10%, 5%, 2%, 1%, 0.5%, 0.1%, 0.05% or 0.01%, or any range of values therebetween. In some embodiments, the aluminum extraction efficiency is, is about, is at most, or is at most about, 10%, 5%, 2%, 1%, 0.5%, 0.1%, 0.05% or 0.01%, or any range of values therebetween. In some embodiments, the Ca extraction efficiency is, is about, is at most, or is at most about, 10%, 5%, 2%, 1%, 0.5%, 0.1%, 0.05% or 0.01%, or any range of values therebetween. In some embodiments, the Mg extraction efficiency is, is about, is at most, or is at most about, 10%, 5%, 2%, 1%, 0.5%, 0.1%, 0.05% or 0.01%, or any range of values therebetween.

In some embodiments, an acid is not utilized in the described process. In some embodiments, a strong acid is not utilized in the described process. In some embodiments, a strong acid includes HCl, HBr, HI, $HNO_3$, $HClO_4$ and $H_2SO_4$. In some embodiments, the lithium rich leach solution has a pH of, of about, of at least, or of at least about 4, 5, 5.5, 6, 6.5, 7, 7.5, 8, 8.5, 9, 9.5, 10, 10.5, 11 or 12, or any range of values therebetween. For example, in some embodiments the lithium rich leach solution has a pH of about 5-10, about 8-10 or 8-9.5.

EXAMPLES

Example 1

Figure 4:
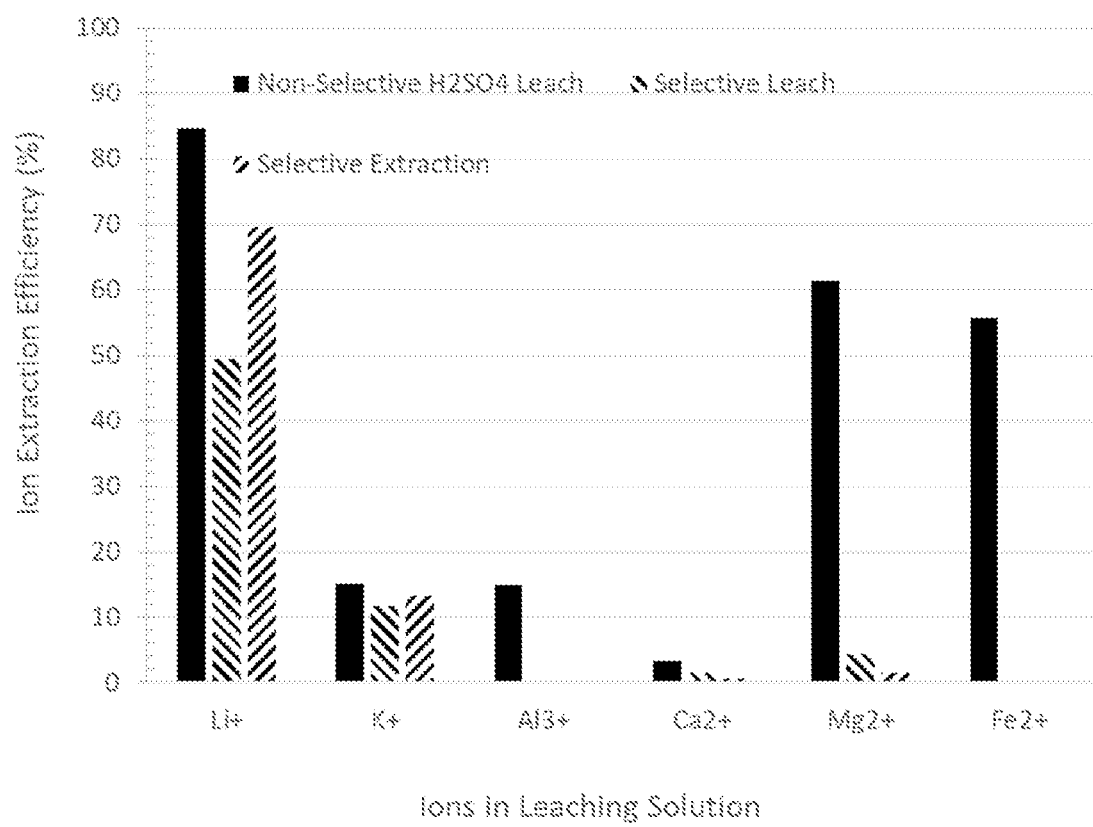
FIG. 4 is a bar chart showing ion extraction efficiencies of elements recovered from a clay mineral using non-selective and selective processes.

FIG. 4 is a chart showing the results of an experiment wherein lithium was extracted from clay materials by a "Non-Selective $H_2SO_4$ Leach" process, a "Selective Extraction" process, and a "Selective Leach" process. In the "Non-Selective $H_2SO_4$ Leach" process, 37.5 g of clay material was mixed with 112.5 g of $H_2SO_4$ (conc. 196 g/L) to form a 150 g slurry. The slurry was leached at 65° C. for 2 hours to form a leaching solution by a non-selective leach. The "Non-Selective $H_2SO_4$ Leach" uses conditions typical for $H_2SO_4$ leach including acid concentration, temperature, and leach duration. In the "Selective Extraction" process, 40 g of clay material and 4 g NaCl were added into a PM100 planetary ball mill and milled for 2 hours at 500 rpm to form the selective extraction product. In the "Selective Leach" process, 33 g of the milled mixture from the "Selective Extraction" process (i.e. 30 g clay material and 3 g NaCl) was added into 117 g of water to form a slurry, and leached at 65° C. for 2 hours to form a leaching solution by a selective leach process.

FIG. 4 demonstrates that the selective extraction processes (i.e. "Selective Extraction" and "Selective Leach") provide improved lithium extraction, with the minimization of aluminum and iron and reduction of magnesium and calcium, relative to the "Non-Selective $H_2SO_4$ Leach."

Example 2: NaCl Additions

The effect of adding NaCl to the milling step of the process was measured. NaCl powders and fine clay mineral particles in weight ratios of 3:97 (i.e. NaCl to total mixture (i.e. NaCl+Clay)=3%; and corresponding to a Na:Li molar ratio of about 2.7:1) were weighed and placed into a PM100 planetary ball mill and continuously milled for up to 3 hours at 500 rpm rotation. The ball-milled NaCl/clay mixture was then collected and transferred into a glass reactor for water leaching. 31 gram of the NaCl/clay mixture was loaded into the reactor with water added to create 150 gram slurries with salt/clay mixture to water weight ratios of 1:4 (i.e. a 20 wt. % salt/clay mixture loading in water). Once the slurry is created, water leaching is performed at 90° C. under 1000 RPM agitation for up to 20 minutes. A condenser is used to minimize the water loss during leaching. Following a subsequent filtration using 5 um filter paper, the leach solution was collected for further chemical composition analysis. The results of the chemical analysis are shown in Table 2.

TABLE 2

| NaCl Added to Milling Step Leach Solution Chemical Composition | | | | | | | |
|---|---|---|---|---|---|---|---|
| Mill Time (Hr) | Li (ppm) | Na (ppm) | K (ppm) | Ca (ppm) | Mg (ppm) | Al (ppm) | Fe (ppm) |
| 0.5 | 111 | 1704 | 181 | 704 | 119 | 0.0 | 0.0 |
| 1 | 159 | 1810 | 243 | 328 | 62 | 0.4 | 0.1 |
| 2 | 178 | 1790 | 291 | 396 | 61 | 0.0 | 0.0 |
| 3 | 211 | 1600 | 357 | 263 | 55 | 0.5 | 0.1 |

The effect of adding NaCl to the leach step of the process was also measured. 40 gram of fine clay mineral particles were weighted and placed into a PM100 planetary ball mill and continuously milled for up to 3 hours at 500 rpm rotation. The ball-milled clay was then collected and transferred into a glass reactor for water leaching. 0.9 gram of NaCl was added into 30 gram of milled clay powders and loaded into the reactor with water to create 150 gram slurries with salt/clay mixture to water weight ratios of 1:4 (i.e. a 20 wt. % salt/clay mixture loading in water; and corresponding to a molar ratio of Na added to Li in clay (i.e. Na:Li molar ratio) of about 2.7:1). Once the slurry is created, water leaching is performed at 90° C. under 1000 RPM agitation for up to 20 minutes. A condenser is used to minimize the water loss during leaching. Following a subsequent filtration using 5 um filter paper, the leach solution was collected for further chemical composition analysis, the results of which are shown in Table 3.

TABLE 3

| NaCl added to Leaching Step Leach Solution Chemical Composition | | | | | | | |
|---|---|---|---|---|---|---|---|
| Mill Time (Hr) | Li (ppm) | Na (ppm) | K (ppm) | Ca (ppm) | Mg (ppm) | Al (ppm) | Fe (ppm) |
| 0.5 | 133 | 1871 | 195 | 387 | 61 | 0.5 | 0.1 |
| 1 | 164 | 1893 | 255 | 312 | 51 | 0.5 | 0.1 |
| 2 | 197 | 1871 | 320 | 268 | 53 | 0.2 | 0.1 |
| 3 | 186 | 1828 | 325 | 258 | 64 | 0.6 | 0.1 |

Figure 5A:
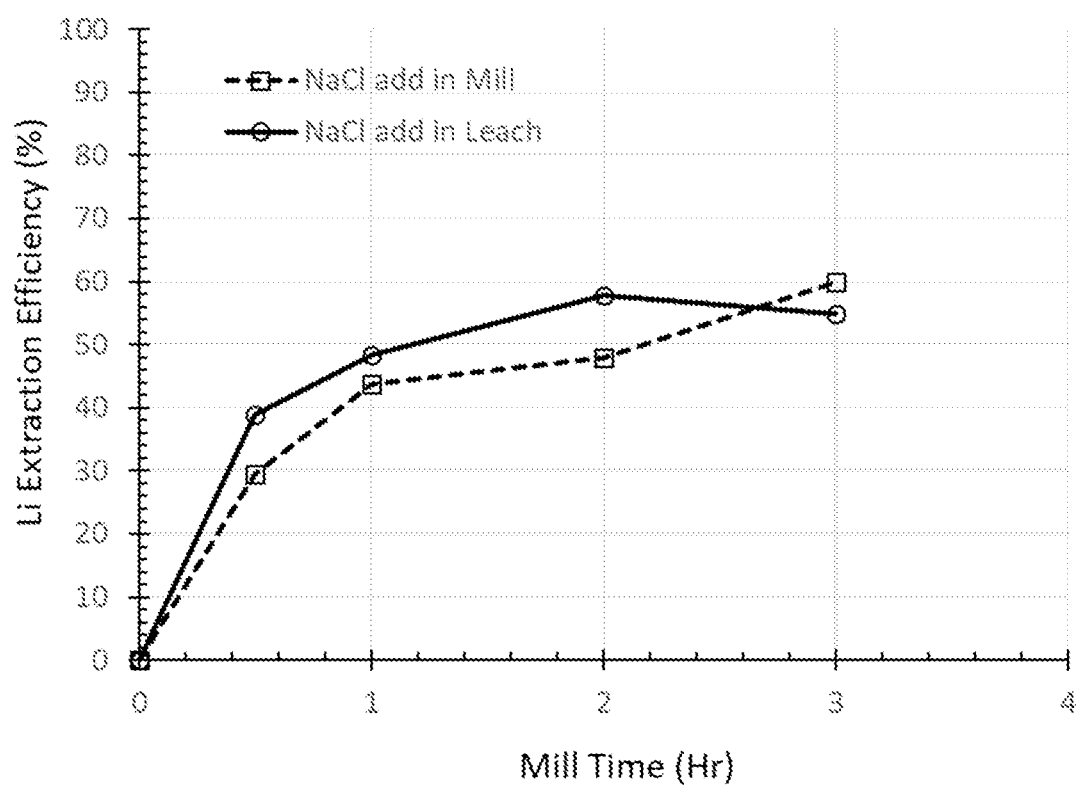
FIG. 5A is a line graph comparing Li extraction efficiencies of elements recovered from a clay mineral using NaCl added into the mill and NaCl added into the leach.
Figure 5B:
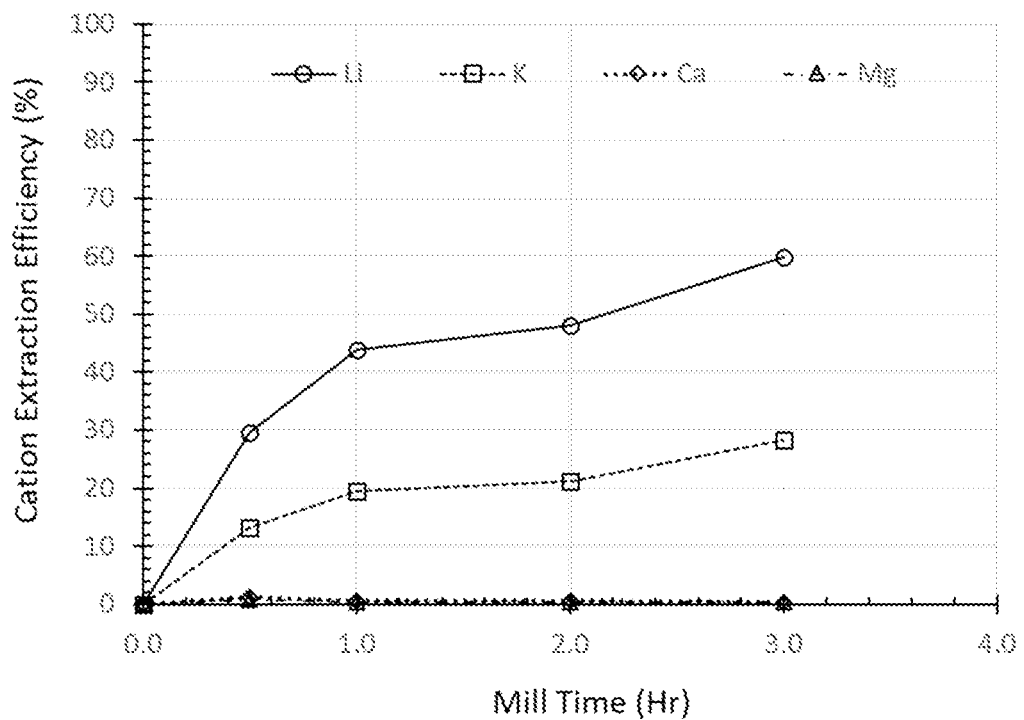
FIG. 5B is a line graph showing cation extraction efficiencies of elements recovered from a clay mineral using NaCl addition as a function of mill time.
Figure 5C:
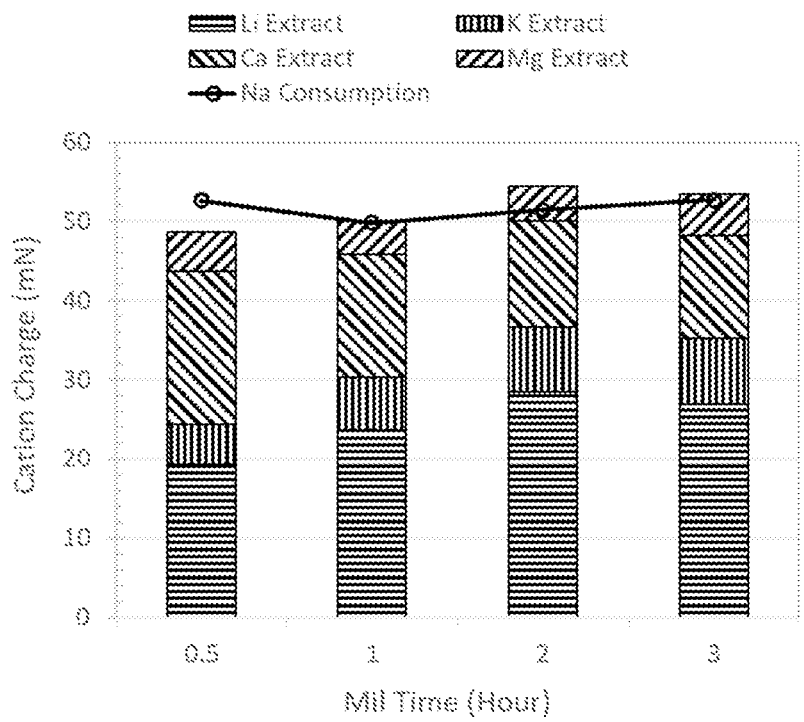
FIG. 5C is a bar chart showing ion-exchange verification and cation consumption using NaCl addition as a function of mill time.

FIG. 5A is a line graph comparing Li extraction efficiencies of elements recovered from a clay mineral using NaCl added into the mill and NaCl added into the leach. FIG. 5B is a line graph showing cation extraction efficiencies of elements recovered from a clay mineral using NaCl addition as a function of mill time. FIG. 5C is a bar chart showing ion-exchange verification and cation consumption using NaCl addition as a function of mill time.

FIGS. 5A, 5B and 5C show that similar Li extraction efficiencies were found for NaCl addition in the mill step or in the leach step. Furthermore, the other major element in leach solution, in addition to Li and Na, is potassium due to the low ion-exchange capability of Na with Ca and Mg. In addition, cation consumption was found to closely track the sum of extracted cation, consistent with the proposed ion-exchange mechanism.

Example 3: $MgCl_2$ Additions

The effect of adding $MgCl_2$ to the milling step of the process was measured. $MgCl_2$ powders and fine clay mineral particles in weight ratios of 5:95 (i.e. $MgCl_2$ to total mixture (i.e. $MgCl_2$+Clay)=5%; and corresponding to a Mg:Li molar ratios of about 2.8:1) were weighted and placed into a PM100 planetary ball mill and continuously milled for up to 3 hours at 500 rpm rotation. The ball-milled $MgCl_2$/clay mixture was then collected and transferred into a glass reactor for water leaching. 31 gram of the $MgCl_2$/clay mixture was loaded into the reactor with water to create 150 gram slurries with salt/clay mixture to water weight ratios of 1:4 (i.e. a 20 wt. % salt/clay mixture loading in water). Once the slurry is created, water leaching is performed at 90° C. under 1000 RPM agitation for up to 20 minutes. A condenser is used to minimize the water loss during leaching. Following a subsequent filtration using 5 um filter paper, the leach solution was collected for further chemical composition analysis. The results of the chemical analysis are shown in Table 4.

TABLE 4

$MgCl_2$ added to Milling Step Leach Solution Chemical Composition

| Mill Time (Hr) | Li (ppm) | Na (ppm) | K (ppm) | Ca (ppm) | Mg (ppm) | Al (ppm) | Fe (ppm) |
|---|---|---|---|---|---|---|---|
| 0.5 | 118 | 525 | 197 | 2296 | 1462 | 1.6 | 0.2 |
| 1 | 163 | 537 | 262 | 2169 | 1220 | 2.0 | 0.2 |
| 2 | 205 | 567 | 362 | 2239 | 1008 | 2.0 | 0.1 |
| 3 | 219 | 586 | 400 | 2210 | 1039 | 2.3 | 0.1 |

The effect of adding $MgCl_2$ to the leach step of the process was also measured. 40 gram of fine clay mineral particles were weighed and placed into a PM100 planetary ball mill and continuously milled for up to 3 hours at 500 rpm rotation. The ball-milled clay was then collected and transferred into a glass reactor for water leaching. 1.5 gram of $MgCl_2$ was added into 30 gram of milled clay powders and loaded into the reactor with water to create 150 gram slurries with salt/clay mixture to water weight ratios of 1:4 (i.e. a 20 wt. % salt/clay mixture loading in water). Molar ratio of Mg added to Li in clay is about 2.8:1, the same as in the above example. Once the slurry is created, water leaching is performed at 90° C. under 1000 RPM agitation for up to 20 minutes. A condenser is used to minimize the water loss during leaching. Following a subsequent filtration using 5 um filter paper, the leach solution was collected for further chemical composition analysis. The results of the chemical analysis are shown in Table 5.

TABLE 5

$MgCl_2$ Added to Leaching Step Leach Solution Chemical Composition

| Mill Time (Hr) | Li (ppm) | Na (ppm) | K (ppm) | Ca (ppm) | Mg (ppm) | Al (ppm) | Fe (ppm) |
|---|---|---|---|---|---|---|---|
| 0.5 | 127 | 469 | 139 | 1565 | 1979 | 1.4 | 0.0 |
| 1 | 169 | 508 | 241 | 1854 | 1636 | 1.6 | 0.0 |
| 2 | 199 | 531 | 317 | 2027 | 1390 | 2.1 | 0.0 |
| 3 | 208 | 546 | 341 | 1880 | 1461 | 2.0 | 0.1 |

Figure 6A:
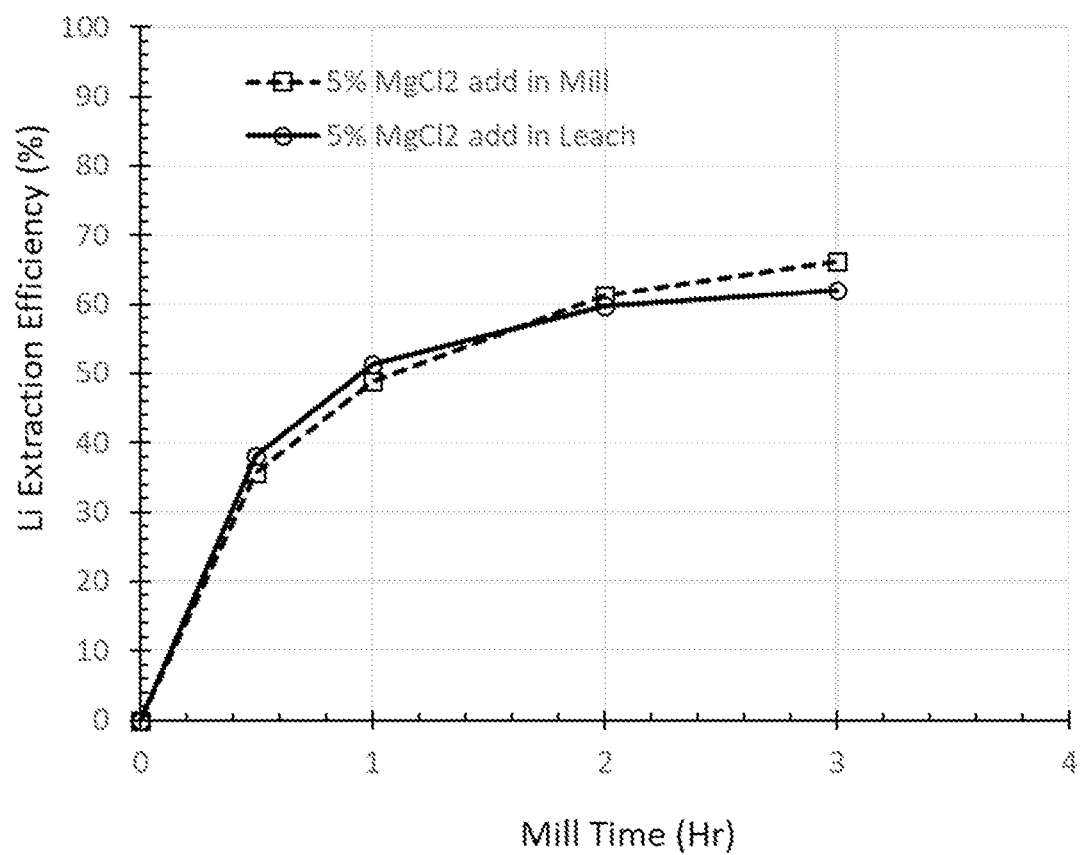
FIG. 6A is a line graph comparing Li extraction efficiencies of elements recovered from a clay mineral using $MgCl_2$ added into the mill and $MgCl_2$ added into the leach.
Figure 6B:
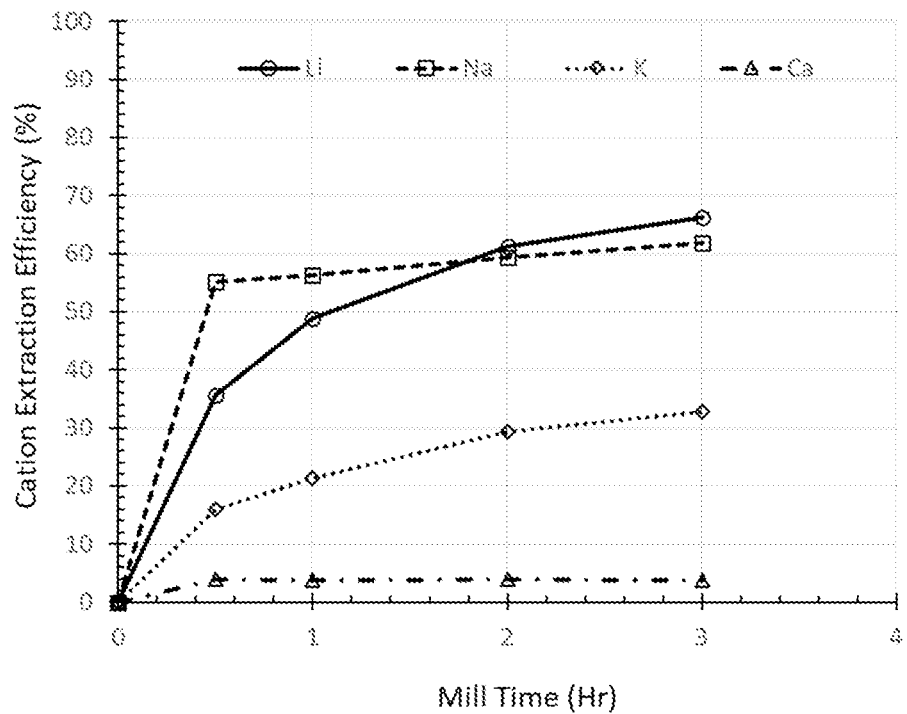
FIG. 6B is a line graph showing cation extraction efficiencies of elements recovered from a clay mineral using $MgCl_2$ addition as a function of mill time.
Figure 6C:
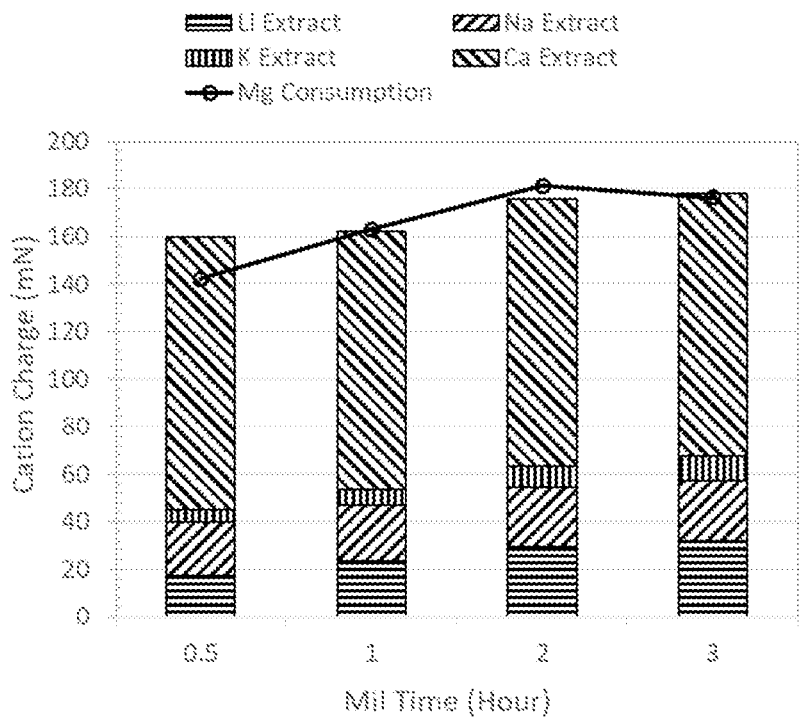
FIG. 6C is a bar chart showing ion-exchange verification and cation consumption using $MgCl_2$ addition as a function of mill time.

FIG. 6A is a line graph comparing Li extraction efficiencies of elements recovered from a clay mineral using $MgCl_2$ added into the mill and $MgCl_2$ added into the leach. FIG. 6B is a line graph showing cation extraction efficiencies of elements recovered from a clay mineral using $MgCl_2$ addition as a function of mill time. FIG. 6C is a bar chart showing ion-exchange verification and cation consumption using $MgCl_2$ addition as a function of mill time.

FIGS. 6A, 6B and 6C show that similar Li extraction efficiencies were found for $MgCl_2$ addition in the mill step or in the leach step. Furthermore, it is demonstrated that use of Mg effectively leaches out Na, K, and Ca by ion-exchange. In addition, cation consumption was found to closely track the sum of extracted cation, consistent with the proposed ion-exchange mechanism.

Example 4: Comparing NaCl and $MgCl_2$ Salts

Figure 7A:
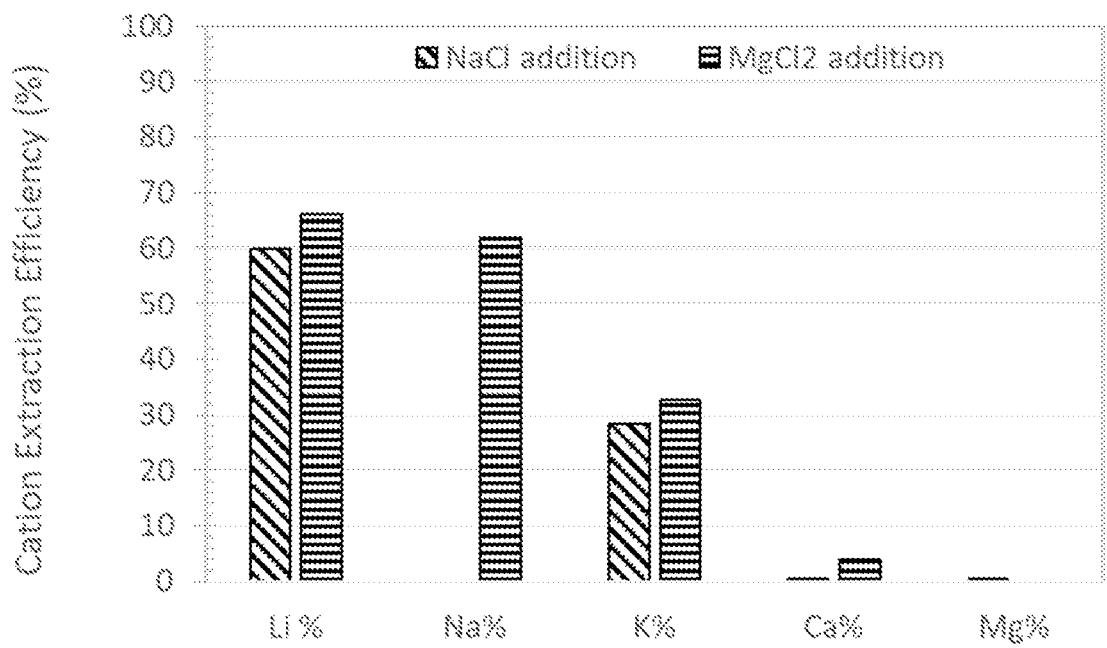
FIG. 7A is a bar chart comparing ion extraction efficiencies of elements recovered from a clay mineral using NaCl added and $MgCl_2$ added.
Figure 7B:
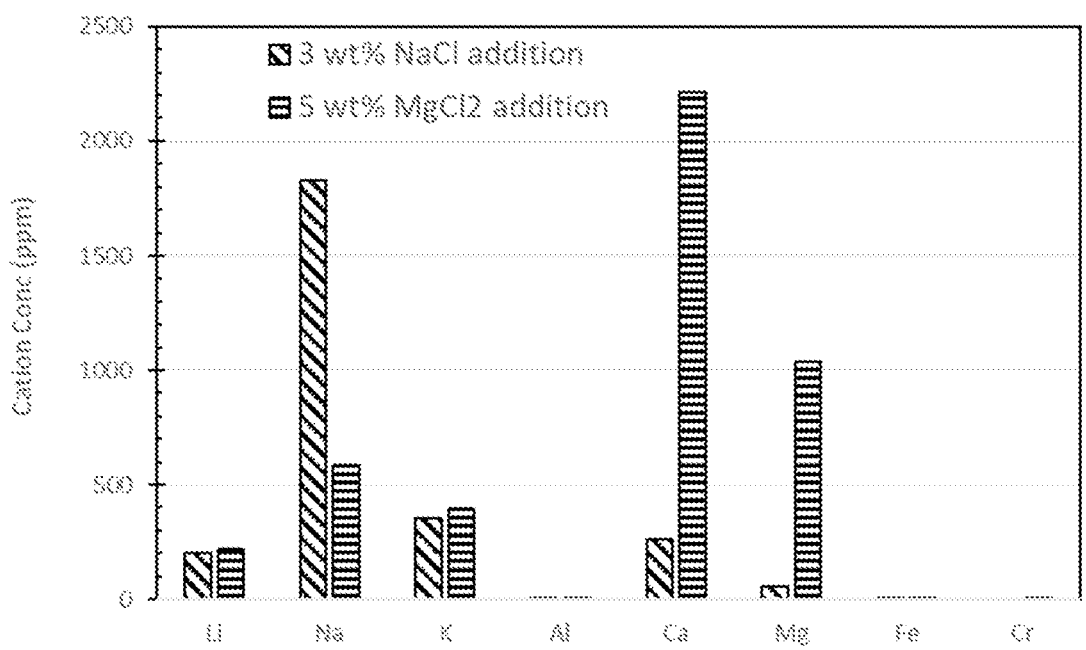
FIG. 7B is a bar chart showing ion concentrations of elements recovered from a clay mineral using NaCl added and $MgCl_2$ added.

FIG. 7A is a bar chart comparing ion extraction efficiencies of elements recovered from a clay mineral using NaCl added and $MgCl_2$, and FIG. 7B is a bar chart showing ion concentrations of elements recovered from a clay mineral using NaCl added and $MgCl_2$. Both FIGS. 7A and 7B compare the results from using the NaCl leach process and the $MgCl_2$ for mill times of 3 hours as described in Examples 2 and 3 herein. FIGS. 7A and 7B demonstrate that only trace amounts of Al, Fe, and Cr observed to be extracted along with the Li, which allow subsequent purifications of the leach solution to be superior to conventional acid leach processes.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. A process for extracting lithium from a clay mineral comprising:
    performing a high-energy mill of a clay mineral comprising lithium;
    forming a mixture comprising a cation source and the clay mineral concurrently with, before or after performing the high-energy mill, wherein the cation source comprises a cation and an anion; and
    contacting the milled clay material and cation source with a solvent concurrently with or directly after forming the mixture and conducting a liquid leach at about 20-100° C. to form a lithium rich leach solution, wherein the lithium rich leach solution comprises:
        lithium at a concentration of at least 100 ppm;
        iron at a concentration of at most 10 ppm; and
        aluminum at a concentration of at most 10 ppm;
    wherein the anion of the cation source is selected from the group consisting of a halide, $SO_4^{2-}$, $NO_3^-$, and combinations thereof.

2. The process of claim 1, wherein the cation source is mixed with the clay mineral before performing the high-energy mill.

3. The process of claim 1, wherein the cation source is mixed with the clay mineral concurrently with performing the high-energy mill.

4. The process of claim 1, wherein the cation source is mixed with the clay mineral after performing the high-energy mill.

5. The process of claim 1, wherein the clay mineral comprises about 0.1-5 g of Li/kg of clay.

6. The process of claim 1, wherein the clay material further comprises one or more additional minerals selected from the group consisting of spodumene, lepidolite, zinnwaldite, smectite, hectorite, muscovite, and combinations thereof.

7. The process of claim 1, wherein the clay mineral comprises one or more additional elements selected from the group consisting of sodium, potassium, iron, aluminum, calcium, magnesium, silicon, chromium, and combinations thereof.

8. The process of claim 1, wherein the cation of the cation source is selected from the group consisting of an alkali metal, an alkaline-earth metal, and combinations thereof.

9. The process of claim 1, wherein the anion of the cation source is a halide.

10. The process of claim 1, wherein the cation source is selected from the group consisting of NaCl, KCl, $Na_2SO_4$, $K_2SO_4$, $MgSO_4$, $CaSO_4$, $NaNO_3$, $KNO_3$, $CaCl_2$, $MgCl_2$, $Ca(NO_3)_2$, $Mg(NO_3)_2$, and combinations thereof.

11. The process of claim 1, wherein the weight ratio of the cation source to the clay mineral is about 1:3 to about 1:50.

12. The process of claim 1, wherein the molar ratio of the cation of the cation source to lithium of the clay mineral is about 1:1 to about 10:1.

13. The process of claim 1, wherein performing the high-energy mill comprises using a high energy mill selected from the group consisting of a planetary ball-mill, an attritor mill, a high shear high energy mill, a vibratory mill, and combinations thereof.

14. The process of claim 1, further comprising pulverizing the clay mineral prior to performing the high-energy mill.

15. The process of claim 1, wherein the liquid leach is performed at about 20-90° C.

16. The process of claim 1, wherein a weight ratio of the mixture to the solvent is about 1:10 to about 3:10.

17. The process of claim 1, wherein the lithium rich leach solution comprises at least 150 ppm of lithium.

18. The process of claim 1, wherein the lithium extraction efficiency of the lithium rich leach solution relative to the clay mineral is at least about 50%.

19. The process of claim 1, wherein the lithium rich leach solution has a pH of about 5-10.

20. The process of claim 1, wherein a mixing solvent is provided to at least one of the clay mineral, the cation source, and the high-energy mill.

21. The process of claim 20, wherein the mixing solvent is the solvent.

22. The process of claim 21, wherein contacting the milled clay material and cation source with the solvent is performed directly after forming the mixture.

23. The process of claim 21, wherein contacting the milled clay material and cation source with the solvent is performed concurrently with forming the mixture.

24. The process of claim 1, wherein contacting the milled clay material and cation source with the solvent is performed concurrently with-forming the mixture.

25. The process of claim 1, wherein the milled clay material and cation source is a powder mixture.

* * * * *